United States Patent
Hada et al.

(10) Patent No.: US 6,169,478 B1
(45) Date of Patent: Jan. 2, 2001

(54) VEHICLE CONTROL SYSTEM HAVING OBSTACLE DETECTOR

(75) Inventors: Satoshi Hada; Shoji Ichikawa; Yoichi Sugimoto; Yoshihiro Urai, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/199,797

(22) Filed: Nov. 25, 1998

(30) Foreign Application Priority Data

Dec. 12, 1997 (JP) .................................................. 9-362576

(51) Int. Cl.[7] .................................................. B60Q 1/00
(52) U.S. Cl. .......................... 340/435; 340/436; 340/903; 340/933; 701/301
(58) Field of Search .................................. 340/903, 933, 340/939, 942, 943, 435, 436, 601, 602; 701/301, 70; 367/909

(56) References Cited

U.S. PATENT DOCUMENTS

| | | | |
|---|---|---|---|
| 5,087,918 | * | 2/1992 | May et al. .......................... 340/435 X |
| 5,530,651 | * | 6/1996 | Uemura et al. .................... 340/435 X |
| 5,594,413 | * | 1/1997 | Cho et al. .......................... 340/435 X |
| 5,631,639 | * | 5/1997 | Hibino et al. .......................... 340/903 |

FOREIGN PATENT DOCUMENTS

| | | |
|---|---|---|
| 4-248489 | 9/1992 | (JP) . |
| 6-298022 | 10/1994 | (JP) . |
| 7-63842 | 3/1995 | (JP) . |
| 8-94749 | 4/1996 | (JP) . |

\* cited by examiner

*Primary Examiner*—Daryl Pope
(74) *Attorney, Agent, or Firm*—Arent Fox Kintner Plotkin & Kahn, PLLC

(57) ABSTRACT

A vehicle control system having a laser radar for detecting an obstacle present ahead on a course of travel of the vehicle; and control device for operating a brake or an alarm based on an output of the laser radar when a distance from the vehicle to the obstacle is less than a first predetermined value or is less than a third predetermined value. In the system, a millimeter-wave radar, which is inferior to the laser radar in position detection accuracy, but is superior in weather-proof operation, is provided. When the laser radar is inoperative, the control device operates the brake or alarm based on the output of the millimeter-wave radar when the distance is less than a second predetermined value (less than the first predetermined value) or is less than a forth predetermined value (greater than the third predetermined value), thereby expediting the alarm initiation to alert the vehicle driver at an appropriate time, while ensuring the proper brake initiation, so as not to cause the vehicle driver to experience annoyance.

5 Claims, 6 Drawing Sheets

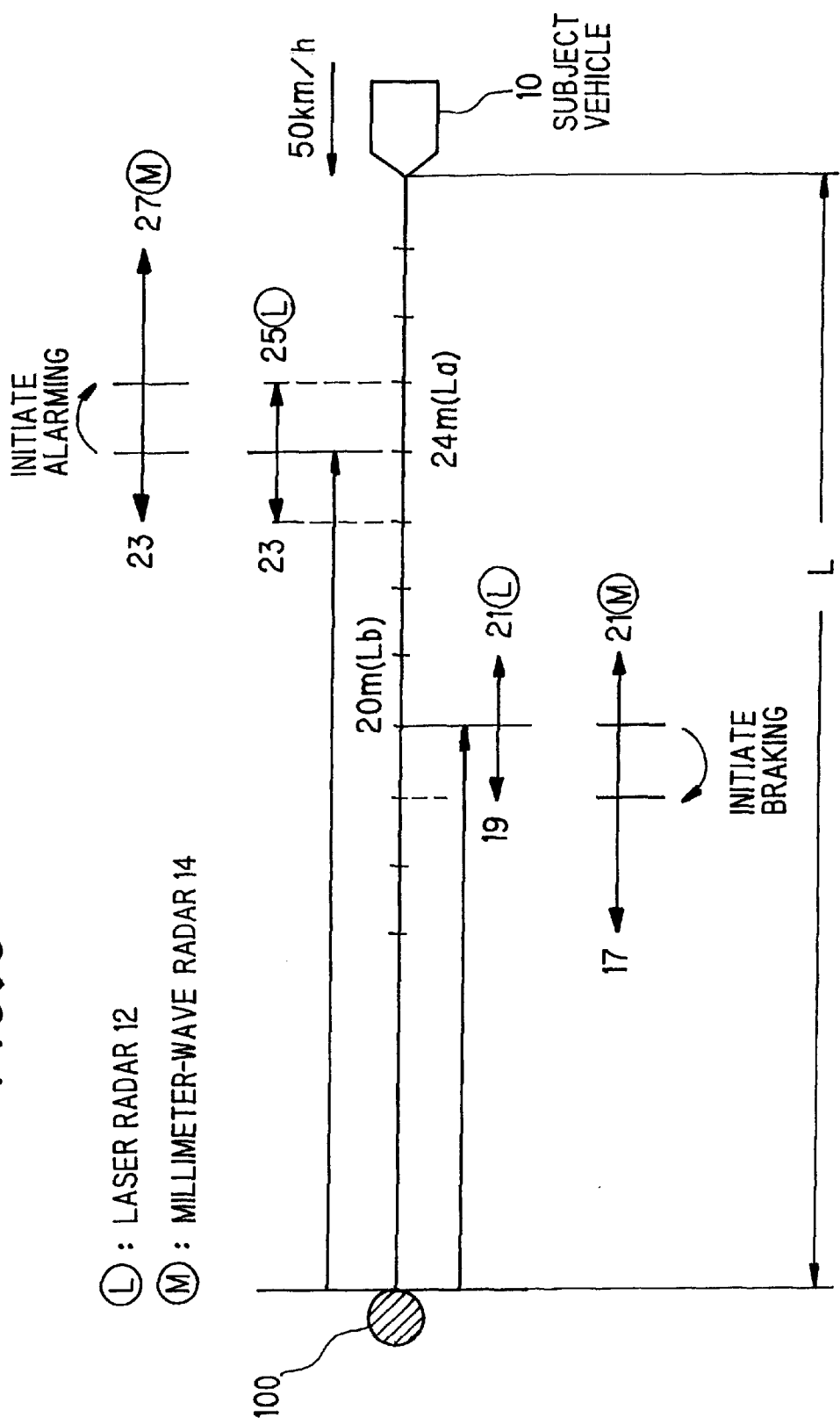

VEHICLE CONTROL SYSTEM HAVING OBSTACLE DETECTOR

BACKGROUND OF THE INVENTION

1. Field of the Invention

This invention relates to a vehicle control system having a combination of obstacle detectors, more particularly to a vehicle control system which has two kinds of sensors for detecting an obstacle present ahead on the course of travel of the vehicle and controls the operation of an alarm or braking of the vehicle in response to the detected result.

2. Description of the Related Art

Various obstacle avoidance techniques have hitherto been proposed. For example, Japanese Laid-open Patent Application Hei 6(1994)-298022 teaches detecting the distance to an obstacle (e.g., another vehicle running ahead on the road) and automatically operating an alarm or a brake, if needed, so as to avoid the contact with the obstacle.

As the sensor for this purpose, a laser radar (also known as "lidar") or a radar utilizing a millimeter waves is often used. Japanese Laid-open Patent Application Hei 4(1992)-248489 discloses the use of the laser radar. Japanese Laid-open Patent Applications Hei 7(1995)-63842 and Hei 8(1996)-94749 disclose the use of the millimeter-wave radar.

Generally speaking, the laser radar is superior to the millimeter-wave radar in position detection accuracy, while the millimeter-wave radar is more resistant than the laser radar against disturbance due to weather (such as rain, fog) or environment. It would therefore be possible to combine these kinds of sensors (different in position detection accuracy) in such manner that the sensors share roles depending on the situations.

The laser radar is superior in position detection accuracy to the millimeter-wave radar, but is apt to be inoperative due to environmental conditions such as bad weather. When these sensors are combined, if the laser radar becomes inoperative, and if the automatic braking is operated based on the output of the millimeter-wave radar, the automatic braking may not always be operated properly, causing the vehicle driver to experience annoyance. This will be the same if the alarm is operated based only on the millimeter-wave radar output, when the laser radar is inoperative.

SUMMARY OF THE INVENTION

An object of the invention is therefore to overcome the foregoing problems by providing a vehicle control system having a combination of obstacle detectors comprised of at least two sensors different in position detection accuracy, which controls the operation of alarming or braking properly, when one of the detectors is inoperative, based on the output of the other detector, thereby sparing the vehicle driver from experiencing annoyance.

To achieve this object, the invention provides a system for controlling a vehicle having a brake which brakes wheels of the vehicle, comprising first obstacle detecting means for detecting an obstacle present ahead on a course of travel of the vehicle; brake control means for operating the brake based on an output of the first obstacle detecting means when a distance from the vehicle to the obstacle is less than a first predetermined value; second obstacle detecting means, different from the first obstacle detecting means in position detection accuracy, for detecting the obstacle present ahead on the course of travel of the vehicle; and inoperativeness determining means for determining whether the first obstacle detecting means is inoperative; wherein the brake control means operates the brake based on an output of the second obstacle detecting means when the distance is less than a second predetermined value which is less than the first predetermined value, when the inoperativeness determining means determines that the first obstacle detecting means is inoperative.

BRIEF EXPLANATION OF DRAWINGS

This and other objects and advantages of the invention will be more apparent from the following description and drawings, in which:

FIG. 6 is an explanatory view showing the procedures described in the flow chart illustrated in FIG. 4.

DETAILED DESCRIPTION OF THE PREFERRED EMBODIMENTS

Embodiments of the invention will now be explained with reference to the attached drawings.

Figure 1:
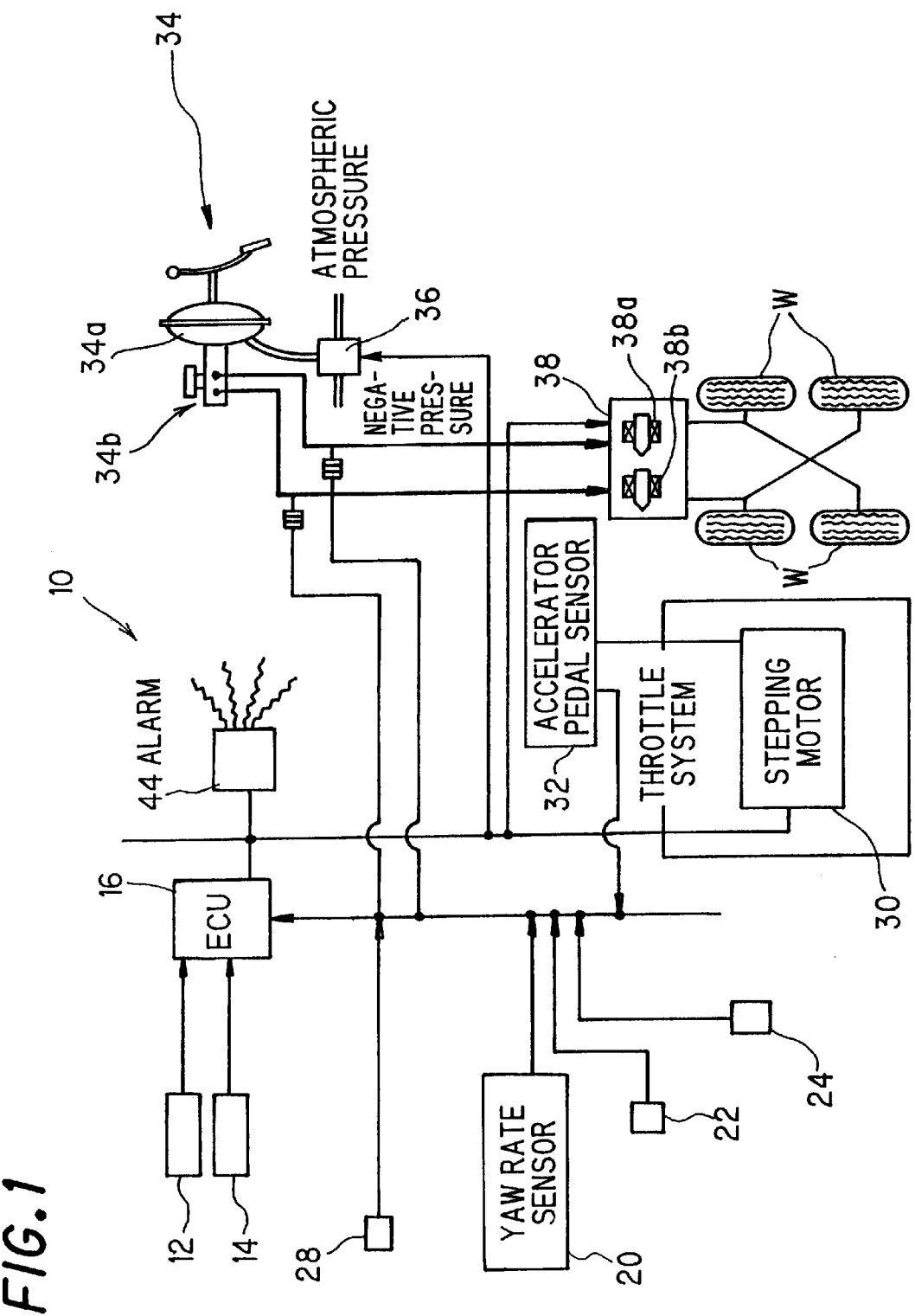
FIG. 1 is an overall schematic view showing the configuration of a vehicle control system according to the invention.
Figure 2:
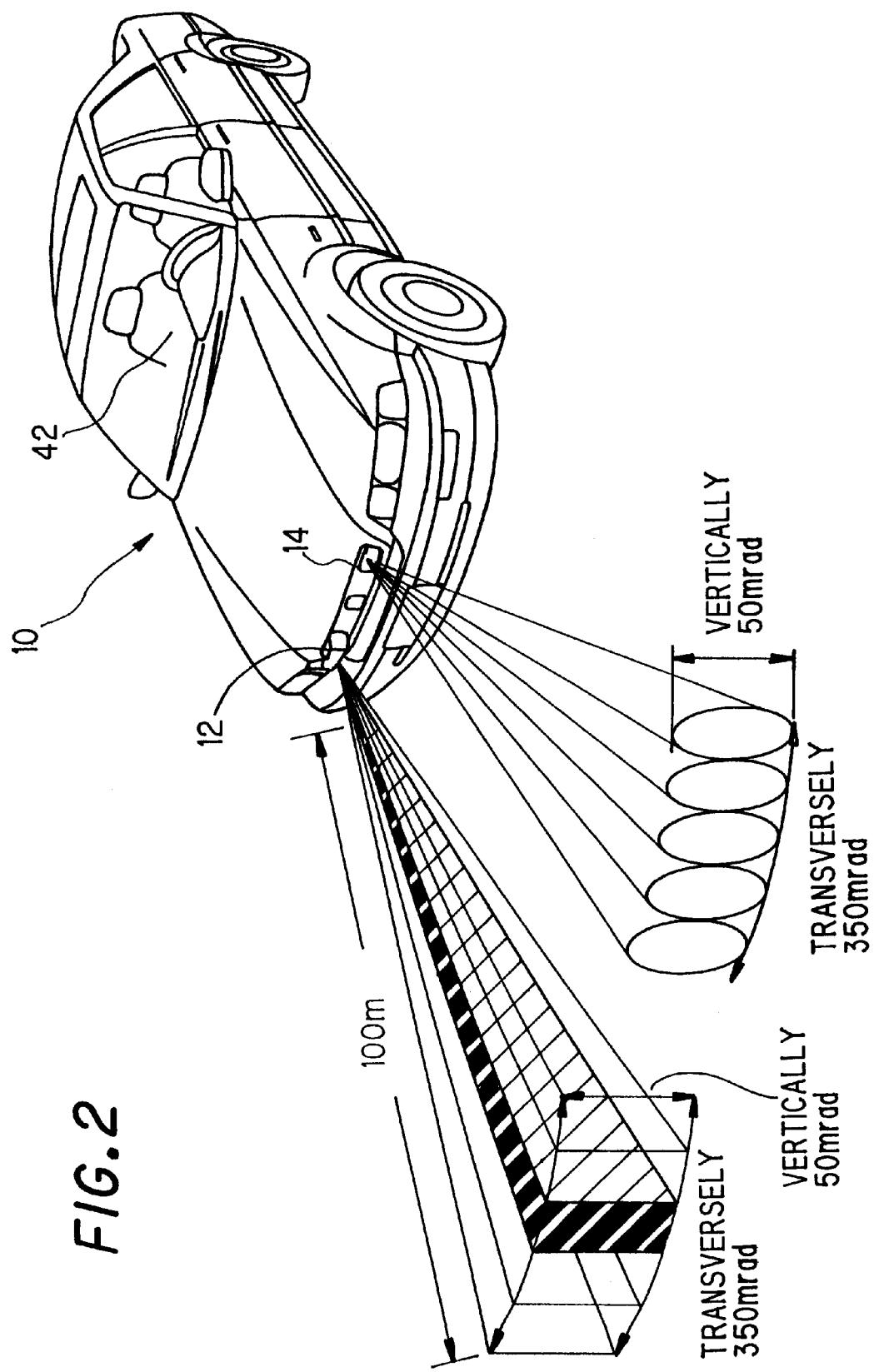
FIG. 2 is a perspective view of the vehicle on which the system is mounted and illustrating beams emitted from a laser radar and a millimeter-wave radar illustrated in FIG. 1.

FIG. 1 is an overall schematic view showing a vehicle control system having a combination of obstacle detectors according to the invention, and FIG. 2 is a perspective view of the vehicle on which the system is mounted.

In the figures, reference numeral 10 designates a vehicle. A laser radar (or lidar) 12 is mounted in the proximity of the right headlight (shown in FIG. 2). The laser radar 12 emits a laser beam (which is a narrow beam of coherent, powerful and nearly nonchromatic electromagnetic radiation energy) and receives an energy reflected from an obstacle or object (such as another vehicle present ahead of the subject vehicle 10).

More specifically, the laser radar 12 emits the laser beam (in pulse) ahead on the course of travel on which the subject vehicle runs. As illustrated in FIG. 2, the laser beam is emitted such that it transversely scans the range of 350 milliradians in the transverse (horizontal) direction and 50 milliradians in the vertical direction.

Figure 3:
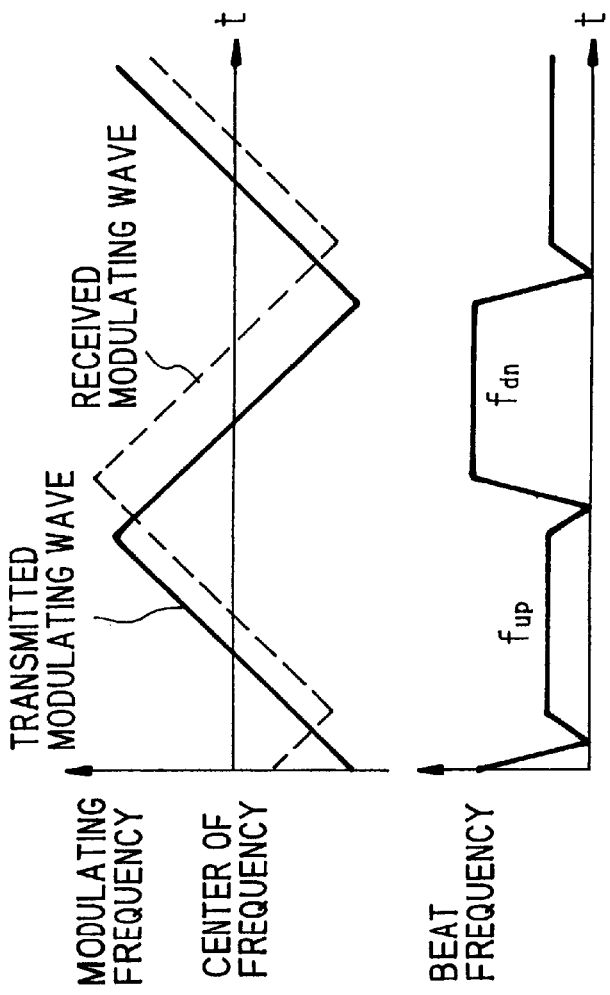
FIG. 3 is an explanation view showing the transmitted and received modulating waves of the millimeter-wave radar shown in FIG. 1.
Figure 3:
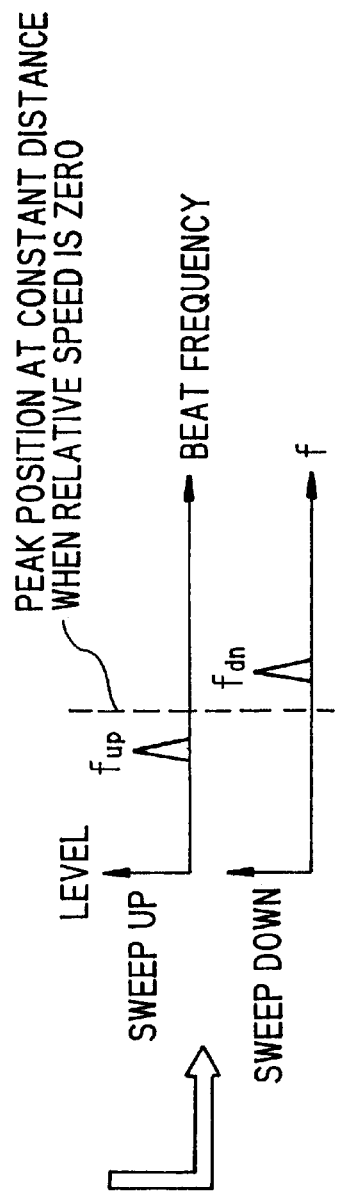

Similarly, another radar (using a millimeter-wave) 14 is mounted in the proximity of the left headlight, and emits a beam of electromagnetic radiation energy in a millimeter wave and receives an energy reflected from the obstacle or object. The millimeter-wave radar 14 is a frequency modulation type (FM-CW radar) and, as illustrated in FIG. 3, emits FM-CW waves (modulating waves of, e.g., 5 mm in wavelength) and receives similar waves reflected from the obstacle.

The scanning range of the millimeter-wave radar 14 is the same as that of the laser radar 12 as shown in FIG. 2. Although the two beams are illustrated to be separate in FIG. 2 for ease of understanding, actually, the beams are emitted such that their ranges to be scanned overlap with each other.

The laser radar 12 is connected to an electronic control unit (hereinafter referred to as "ECU") 16 comprising microcomputers. The ECU 16 has a laser radar output processing unit and a millimeter-wave radar output processing unit (neither shown) each comprised of a microcomputer.

The output of the laser radar 12 is forwarded to the ECU 16 and is input to the laser radar output processing unit. The laser radar output processing unit detects the distance (relative distance) to an obstacle or object from the vehicle 10 by measuring the time interval between transmission of the energy and reception of the reflected energy, which establishes the range of the obstacle in the beam's path. Moreover, the laser radar output processing unit detects the (relative) speed of the obstacle, relative to the subject vehicle 10, by differentiating the measured distance. The laser radar processing unit also detects the direction or orientation of the obstacle from the reflected energy to obtain two-dimensional information of the obstacle.

The signals transmitted and received by the millimeter-wave radar 14 are similarly forwarded to the ECU 16 and are input to the millimeter-wave radar output processing unit. The millimeter-wave radar output processing unit mixes the received signal with the transmitted signal to generate a beat signal, and detects the relative distance and the relative speed of the obstacle from the frequency in the beat signal (beat frequency). The millimeter-wave radar processing unit also detects the direction or orientation of the obstacle from the reflected energy to obtain similar two-dimensional information of the obstacle.

Since the laser radar 12 and the millimeter-wave radar 14 used here are those known in the art, no further explanation will be made.

A yaw rate sensor 20 is provided at the center of the vehicle 10 to generate a signal indicative of the yaw rate (yaw angular velocity acting at the center of gravity of the vehicle 10 about the gravitational or vertical direction). The output of the yaw rate sensor 20 is sent to the ECU 16. The ECU 16 detects the yaw angle based on the output of the yaw rate sensor 20.

A steer angle sensor 22 is provided at an appropriate location near the steering mechanism (not shown) of the vehicle 10 to generate a signal indicative of the steer angle input through a steering wheel (not shown) by the vehicle driver. A vehicle speed sensor 24 is provided in the proximity of the drive shaft (not shown) to generate a signal indicative of the vehicle (traveling) speed of the vehicle 10.

In the vehicle 10, not mechanically linked with the accelerator pedal (not shown) on the vehicle driver seat's floor, the throttle valve (not shown) installed in the air intake system is connected to a stepping motor 30 and is opened or closed by the motor 30. The accelerator pedal has an accelerator pedal sensor 32 which generates a signal indicative of the amount of depression of the accelerator pedal.

The outputs of the sensors are sent to the ECU 16.

The reference numeral 34 indicates a brake system of the vehicle 10.

In the brake system 34, the foot brake (brake pedal) is connected to the master-back 34a which is, in turn, connected to an electromagnetic solenoid valve 34. When the electromagnetic solenoid valve 34 is made open, the negative pressure is introduced from the air intake system and boosts the brake pedal depression by the vehicle driver. The master-back 34a is connected to a master cylinder 34b.

The master cylinder 34b houses a reservoir (not shown) which outputs brake oil regulated under pressure in response to the boosted brake pedal depression. The pressurized brake oil is sent to a hydraulic brake mechanism 38 (having electromagnetic solenoid valves 38a, 38b), which operates a brake caliper (not shown) mounted at each of four wheels W to slow or stop the rotation thereof. This is the case when the vehicle driver himself operates the brake manually.

In the embodiment, the system is configured such that the vehicle 10 can also be slowed or stopped by an automatic braking.

Specifically, the ECU 16 detects an obstacle or object present ahead on the course of travel of the subject vehicle 10 based on the output of either of the laser radar 12 and the millimeter-wave radar 14 as will later be explained in detail, determines a command in duty ratio (in Pulse Width Modulation) and operates the electromagnetic solenoid valve 38a of the hydraulic brake mechanism 38 in response to the command to slow or stop the rotation of the wheels W.

An alarm (e.g., an audio system or visionary indicator) 44 is provided in the proximity of the driver's seat 42 (illustrated in FIG. 2), which alerts the vehicle driver in response to a command generated by the ECU 44 indicating that the obstacle is close.

The operation of the vehicle control system will be explained.

Figure 4:
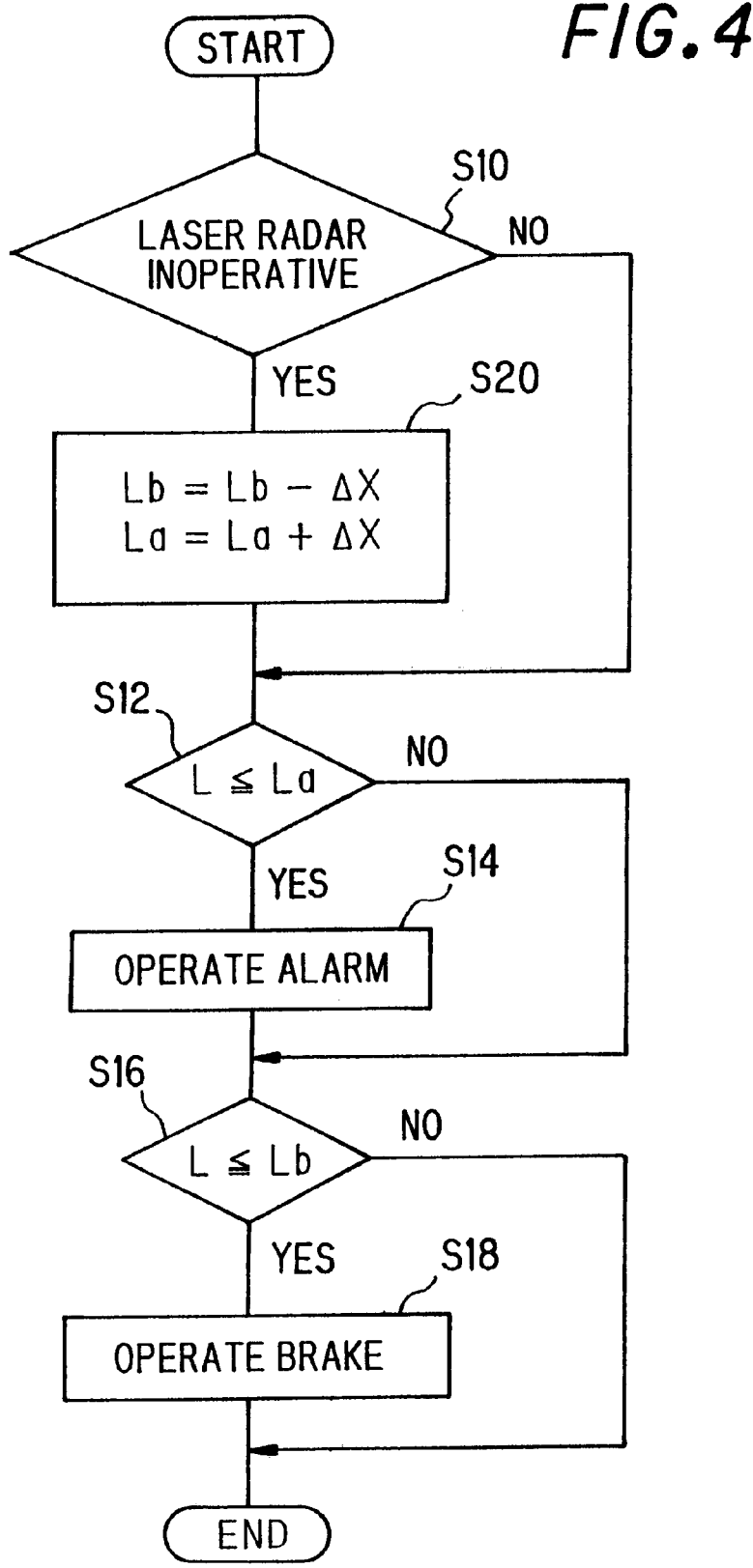
FIG. 4 is a flow chart showing the operation of the system illustrated in FIG. 1.

FIG. 4 is a flow chart showing the operation of the system. The program shown there is executed once every, for example, 100 milliseconds.

Explaining this, the program begins in S10 in which it is determined or discriminated through an appropriate technique whether the laser radar is inoperative. Here, the term "inoperative" means the situation in which the laser radar 12 does not perform the expected and demanded position detection accuracy due to causes including mechanical trouble such as breaking, shortcircuiting or dirt sticking in the sensor, or any other causes resulting from environmental conditions, such as backlight from a vehicle running in the opposite direction, or bad weather (rain, fog, snow).

When the result in S10 is negative, the program proceeds to S12 in which it is determined whether the distance L (the relative distance to an obstacle or object 100 (illustrated in FIG. 6) from the subject vehicle 10) is less than a first threshold value La.

When the result is affirmative, the program proceeds to S14 in which the alarm 44 is operated to inform the vehicle driver of this fact. On the other hand, when the result in S12 is negative, the program skips S14.

The program then proceeds to S16 in which it is determined whether the distance L is less than a second threshold value Lb. When the result is affirmative, the program proceeds to S18 in which the hydraulic brake mechanism 38 is operated through the energization/deenergization of the electromagnetic solenoid valves 38a, 38b to effect the automatic braking. When the result in S16 is negative, the program is immediately terminated.

On the other hand, when the result in S10 is affirmative, the program proceeds to S20 in which a predetermined value ΔX is subtracted from the second threshold value Lb to correct the same, while the same value is added to the first threshold value La to correct the same. In other words, when the result in S10 is affirmative, the threshold values La, Lb are changed. The program then proceeds to S12 and on to conduct the procedures mentioned above.

This change of threshold values is explained with reference to FIGS. 5 and 6.

The system in this embodiment uses a combination of obstacle detectors comprising the laser radar 12 and the millimeter-wave radar 14. Generally speaking, the laser radar 12 is superior to the millimeter-wave radar 14 in position detection accuracy, as mentioned above. In particular, the laser radar has excellent resolving power for detecting direction or orientation. On the other hand, the detection ability of laser radar drops in bad weather conditions. The laser radar is likely to be disturbed due to clutter from rain or fog in bad weather conditions. The detection ability is similarly degraded if dirt sticks to the laser radar.

This drop of detection ability is greater compared to the millimeter-wave radar 14. In other words, the laser radar 12 is inferior to the millimeter-wave radar in terms of weather- and environment-related limitations. However, although the millimeter-wave radar 14 is superior to the laser radar 12 in weather-proof or environment-proof operation, the millimeter-wave radar 14 is inferior to the laser radar 12 in position detection accuracy, in particular in resolving power in direction or orientation.

Although the sensor performance depends on its manufacturing cost, the laser radar 12 and the millimeter-wave radar 14 will generally be compared as above.

Figure 5:
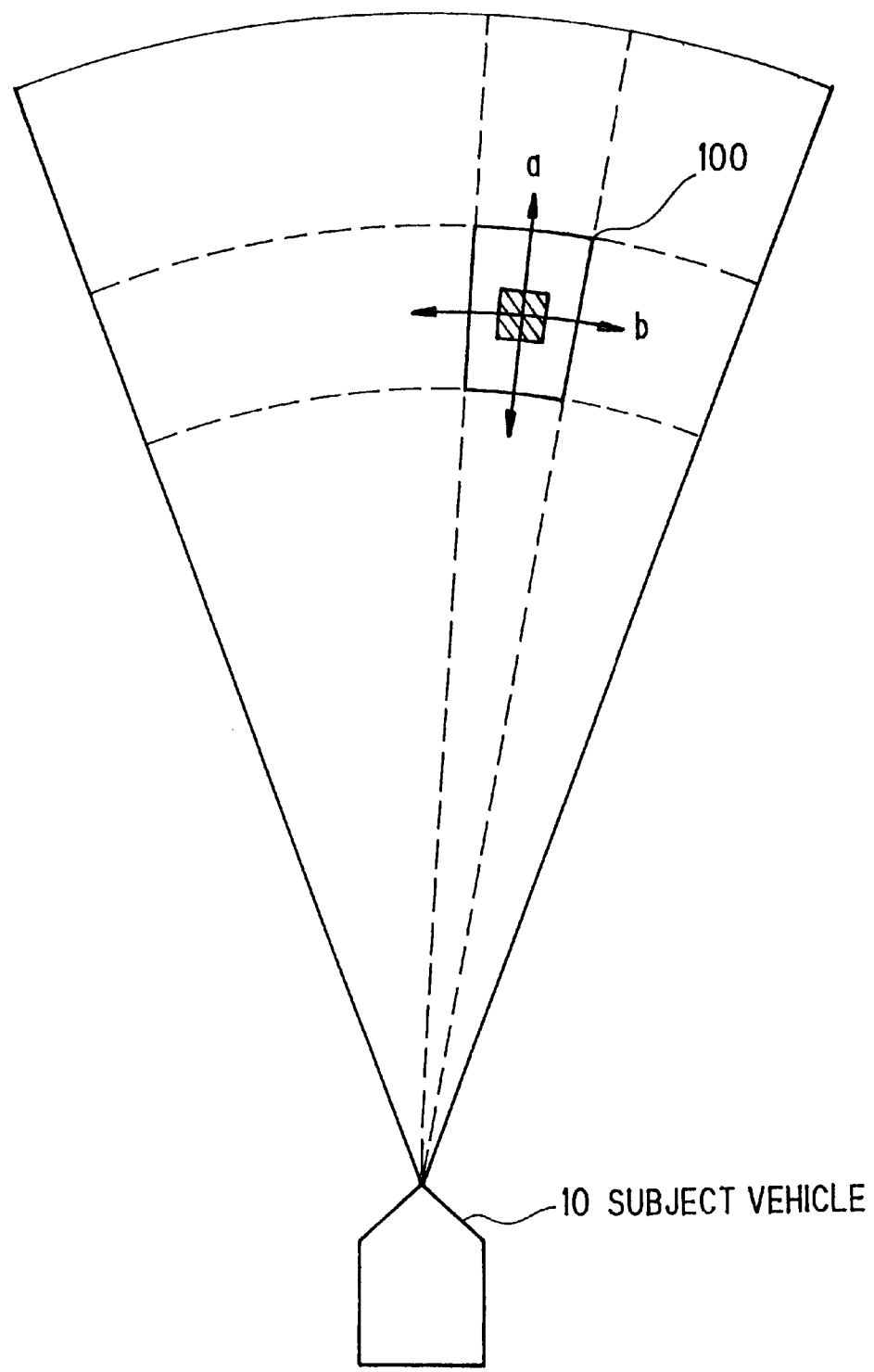
FIG. 5 is an explanatory view explaining the position detection accuracy (error) of the laser radar and the millimeter-wave radar illustrated in FIGS. 1 and 2.

As illustrated in FIG. 5, the obstacle (such as another vehicle) 100 present on the course of travel ahead of the subject vehicle 10 is detected by the laser radar 12 and the millimeter-wave radar 14. Considering the distance a and the direction b (transverse to the course of travel), together, as "position", if the distance is 100 m (meters), the position detection accuracy (i.e., detection error) of the laser radar 12 is approximately 1 m, while that of the millimeter-wave radar 14 is approximately 2 m.

Thus, the laser radar 12 and the millimeter-wave radar 14 are different from each other in position detection accuracy. Briefly speaking, they differ by approximately 1 m in position detection accuracy (or error).

Therefore, the system in this embodiment is configured such that the alarm 44 or the hydraulic brake mechanism 38 is operated based on the output of the laser radar 12, in view of its detection error of plus/minus 1 m, when the laser radar 12 is operative. When the laser radar is determined to be operative, on the other hand, the alarm 44 or the hydraulic brake mechanism 38 is operated based on the output of the millimeter-wave radar 14 in view of the detection error difference (between the laser radar detection error and the millimeter-wave radar detection error) of plus/minus 1 m.

The above is explained more specifically referring to FIG. 6.

If the traveling speed of the subject vehicle 10 is 50 km/h, the distances (threshold values) at which the operation of the alarm 44 and the hydraulic brake mechanism are to be initiated are determined as follows, when the laser radar 12 operates.

distance at which alarming is to be initiated (La) . . . 24 m distance at which automatic braking is to be initiated (Lb) . . . 20 m.

Actually, the distances are determined to have a range as follows taking the laser radar position detection error of plus/minus 1 m into account;

distance at which alarming is to be initiated . . . 23 m to 25 m distance at which automatic braking is to be initiated . . . 19 m to 21 m, such that the operation of the alarm 44 is initiated when the detected distance relative to the obstacle is within the range of 23 m to 25, or the operation of the hydraulic brake mechanism 38 is initiated when the detected distance to the obstacle is within the range of 19 m to 21 m.

If the laser radar 12 is determined to be inoperative, on the other hand, the control is conducted based on the output of the millimeter-wave radar 14. Here, the distances (threshold values) at which the operation of the alarm 44 and the hydraulic brake mechanism are initiated, taking the position detection error difference 1 m (=2 m−1 m; corresponding to the aforesaid predetermined value ΔX), are altered in such a manner that the alarm initiation distance is enlarged and the brake initiation distance is shortened by the difference as follows;

distance at which alarming is to be initiated (La) . . . 25 m distance at which automatic braking is to be initiated (Lb) . . . 19 m.

Similarly, taking the millimeter-wave radar position detection error of plus/minus 2 m into account, the range of distances are changed as follows;

distance at which alarming is to be initiated . . . 23 m to 27 m distance at which automatic braking is to be initiated . . . 17 m to 21 m.

Specifically, the distances La, Lb are changed such that the operation of the alarm 44 is expedited, while the braking is delayed, when the laser radar 12 becomes inoperative. With reference to the ranges of distance, the maximum alarm initiation distance is enlarged by 2 m, while the minimum alarm initiation distance remains unchanged. The maximum brake initiation distance remains unchanged, but the minimum brake initiation distance is shortened by 2 m.

Thus, when the laser radar 12 is inoperative, the distance for alarm initiation (La) is elongated, in other words, it may be equivalently said that the threshold value (La) is lowered, while the distance for brake initiation (Lb) is shorted, wherein it may equivalently be said that the threshold value (Lb) is raised. As a result, when the laser radar 12 is inoperative, the alarm is more likely to be generated, while the braking is less likely to be generated, compared to the case when the laser radar 12 is operative, thereby expediting the alarm initiation to alert the vehicle driver at an appropriate time, while ensuring the proper brake initiation, so as not to cause the vehicle driver to experience annoyance.

With this, moreover, the vehicle driver is warned to drive the vehicle taking the margin of obstacle avoidance into account to maintain the safety of driving as before. Furthermore, the vehicle driver may detect the failure of the laser radar 12 upon noticing the expedited alarm initiation.

Thus, the embodiment is configured to have a system for controlling a vehicle (10) having a brake (electromagnetic solenoid valve 36, hydraulic brake mechanism 38) which brakes wheels (W) of the vehicle, including: first obstacle detecting means (laser radar 12, laser radar output processing unit, ECU 16) for detecting an obstacle (100) present ahead on a course of travel of the vehicle (10); and brake control means (ECU 16, S16–S18) for operating the brake based on an output of the first obstacle detecting means when a distance (L) from the vehicle (10) to the obstacle (100) is less than a first predetermined value (Lb); characterized in that; the system comprises: second obstacle detecting means (millimeter-wave radar 14, millimeter-wave radar output processing unit, ECU 16), different from the first obstacle detecting means in position detection accuracy, for detecting the obstacle (100) present ahead on the course of travel of the vehicle (10); and inoperativeness determining means (ECU 16, S10) for determining whether the first obstacle detecting means is inoperative; and wherein the brake control means (ECU 16, S16–S18) operates the brake based on an output of the second obstacle detecting means when the distance (L) is less than a second predetermined value (Lb–ΔAX) which is less than the first predetermined value (Lb), when the inoperativeness determining means determines that the first obstacle detecting means is inoperative. With this arrangement, the distance (Lb) for braking is shortened, i.e., the threshold value (Lb) for braking is raised, thereby enabling prevention of inappropriate operation of the brake from happening, without causing the vehicle driver to experience annoyance, when the first obstacle detecting means, i.e., the laser radar 12 becomes inoperative.

The system is configured to further include alarm control means (ECU 16, S12–S14) for operating an alarm based on an output of the first obstacle detecting means when the distance (L) is less than a third predetermined value (La); and wherein the alarm control means (ECU 16, S12–S14) operates the alarm based on an output of the second obstacle detecting means when the distance (L) is less than a fourth predetermined value (La+ΔX) which is greater than the third predetermined value (La), when the inoperativeness determining means determines that the first obstacle detecting means is inoperative. With this arrangement, in addition to the advantages mentioned above, the distance at which alarming is initiated (La) is increased, in other words, the threshold value (La) for alarming is lowered. The vehicle driver is accordingly warned to drive the vehicle taking the margin of obstacle avoidance into account to maintain the safety of driving as before, if the first obstacle detecting means (laser radar 12) becomes inoperative. Moreover, the vehicle driver may detect the failure of the first obstacle detecting means (laser radar 12) upon noticing the expediting of alarm initiation.

In the system, the second and fourth predetermined values are determined based on a difference (ΔX) in position detection accuracy between the first and second obstacle detecting means. With this, in addition to the advantages mentioned above, the threshold values can be changed more appropriately.

In the system, the first predetermined value and second predetermined value (Lb, Lb–ΔX) are values each having a range determined based on a position -detection error of the first obstacle detecting means. In the system, the brake control means (ECU 16, S16–S18) initiates to operate the brake when the distance (L) is in the range of the first predetermined value (Lb) or the second predetermined value (Lb–ΔX).

In the system, the third predetermined value and fourth predetermined value (La, La+ΔX) are values each having a range determined based on the position detection error of the first obstacle detecting means. In the system, the alarm control means (ECU 16, S12–S14) initiates to operate the alarm when the distance (L) is in the range of the third predetermined value (La) or the fourth predetermined value (La+ΔX).

In the system, the first obstacle detecting means is a laser radar, and the second obstacle detecting means is a millimeter-wave radar which is inferior to the laser radar in position detection accuracy.

In the above, when the detected distance is less than that for alarming or braking, i.e., when the result in S12 or S16 is affirmative, alarming or braking is effected at S14 or S18 in the flow chart of FIG. 4. The alarming or braking may be applied at an even level, or may be varied. To be more specific, when using a warning indicator, an even pattern may be used during alarming. When using an audio system, the sound may be kept level during alarming. Alternatively, the pattern or sound may be increased in, for example, amplitude, frequency or volume, as the distance to the obstacle decreases. Similarly, the braking force may be increased with decreasing distance.

In the above, when the laser radar 12 is determined to be inoperative in S10 in the flow chart of FIG. 4, the system may be configured to switch on an indicator so as to inform the fact to the vehicle driver.

In the above, although the pulse-modulation type is used as the radar laser 12 and the FM-CW type is used as the millimeter-wave radar 14, it is not limited to them. Other types of radars may alternatively be used.

In the above, although a combination of the laser radar 12 and the millimeter-wave radar 14 is used, this is an example and any other combination may alternatively be possible. For example, a combination of a millimeter-wave radar and another millimeter-wave radar, or a combination of a millimeter-wave radar and a micrometer-wave radar may instead be used. The gist of the invention is to use a combination of sensors which are different from each other in position detection accuracy. The number of radars are not limited to two, and three or more radars may be combined together.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling a vehicle having a brake which brakes wheels of the vehicle, comprising:

first obstacle detecting means for detecting an obstacle present ahead on a course of travel of the vehicle;

brake control means for operating the brake based on an output of the first obstacle detecting means when a distance from the vehicle to the obstacle is less than a first predetermined value;

second obstacle detecting means, different from the first obstacle detecting means in position detection accuracy, for detecting the obstacle present ahead on the course of travel of the vehicle; and inoperativeness determining means for determining whether the first obstacle detecting means is inoperative;

wherein:

the brake control means operates the brake based solely on an output of the second obstacle detecting means when the distance is less than a second predetermined value which is less than the first predetermined value, when the inoperativeness determining means determines that the first obstacle detecting means is inoperative.

2. A system according to claim 1, further including:

alarm control means for operating an alarm based on an output of the first obstacle detecting means when the distance is less than a third predetermined value; and wherein:

the alarm control means operates the alarm based on an output of the second obstacle detecting means when the distance is less than a fourth predetermined value which is greater than the third predetermined value, when the inoperativeness determining means determines that the first obstacle detecting means is inoperative.

3. A system according to claim 1, wherein the second predetermined values is determined based on a difference in position detection accuracy between the first and second obstacle detecting means.

4. A system according to claim 2, wherein the fourth predetermined values is determined based on a difference in position detection accuracy between the first and second obstacle detecting means.

5. A system according to claim 2, wherein the second predetermined value is determined based on a difference in position detection accuracy between the first and second obstacle detecting means.

* * * * *